United States Patent [19]
Wiegele et al.

[11] Patent Number: 5,874,798
[45] Date of Patent: Feb. 23, 1999

[54] MICRO-TURBO GENERATOR DEVICE

[75] Inventors: Thomas G. Wiegele, Phoenix, Ariz.; Karl W. Wyatt, Cary, Ill.; Neil A. Duffie, Madison, Wis.

[73] Assignee: Motorola, Inc., Schaumburg, Ill.

[21] Appl. No.: 667,304

[22] Filed: Jun. 20, 1996

[51] Int. Cl.$^6$ ............................................. H02K 17/42
[52] U.S. Cl. ................. 310/168; 310/40 MM; 310/49 R; 310/50; 310/68 R; 310/309
[58] Field of Search ................. 310/40 MM, 49 R, 310/50, 68 R, 66, 309; 415/80, 503; 156/651, 655, 657; 433/118, 120

[56] References Cited

U.S. PATENT DOCUMENTS

| | | | |
|---|---|---|---|
| 2,436,683 | 2/1948 | Wood, Jr. | 290/52 |
| 2,463,538 | 3/1949 | Horrell | 290/52 |
| 4,060,336 | 11/1977 | Theis, Jr. et al. | 415/80 |
| 4,367,413 | 1/1983 | Nair | 290/52 |
| 4,367,891 | 1/1983 | Spirk | 290/52 |
| 4,484,892 | 11/1984 | Pernot et al. | 433/118 |
| 4,507,085 | 3/1985 | Mosimann et al. | 433/126 |
| 4,511,806 | 4/1985 | May | 290/52 |
| 4,520,273 | 5/1985 | Rowe | 290/54 |
| 4,616,298 | 10/1986 | Bolson | 362/192 |
| 4,654,537 | 3/1987 | Gaspard | 290/52 |
| 4,720,640 | 1/1988 | Anderson et al. | 290/43 |
| 4,849,648 | 7/1989 | Longardner | 290/54 |
| 4,997,521 | 3/1991 | Howe et al. | 156/651 |
| 5,149,984 | 9/1992 | Schultz et al. | 290/54 |
| 5,189,323 | 2/1993 | Carr et al. | 310/40 MM |
| 5,296,775 | 3/1994 | Cronin et al. | 310/309 |
| 5,509,418 | 4/1996 | Lum et al. | 128/662.06 |
| 5,710,466 | 1/1998 | Allen et al. | 310/40 MM |

*Primary Examiner*—Nestor Ramirez
*Assistant Examiner*—Elvin G. Enad
*Attorney, Agent, or Firm*—Douglas D. Fekete; John MacIntyre

[57] ABSTRACT

A micro-turbo generator device (10) includes a housing (12), a rotor (14), a plurality of stator cores (16), and coils (18) encircling the stator cores. The housing (12) includes a shaft (34) which has an axis (11). The rotor (14) is rotatably mounted onto the shaft (34) and includes a perimeter (32) and a plurality of rotor poles (24) extending generally radially about the axis (11). Each rotor pole (24) includes a magnetizable tip (30) and a concave fluid impact surface (26). The stator cores (16) are disposed about the rotor (14) and include first pole face (15) and second pole face (17) facing the perimeter (32) of the rotor (14) and spaced apart therefrom. The coils (18) helically encircle the stator cores (16) and conduct electrical current to magnetize the stator cores (16) to magnetize the tips (30) and to alternately conduct induced electrical current generated in response to changes in magnetic flux between the first and second pole faces (15, 17) and the magnetizable tips (30).

19 Claims, 3 Drawing Sheets

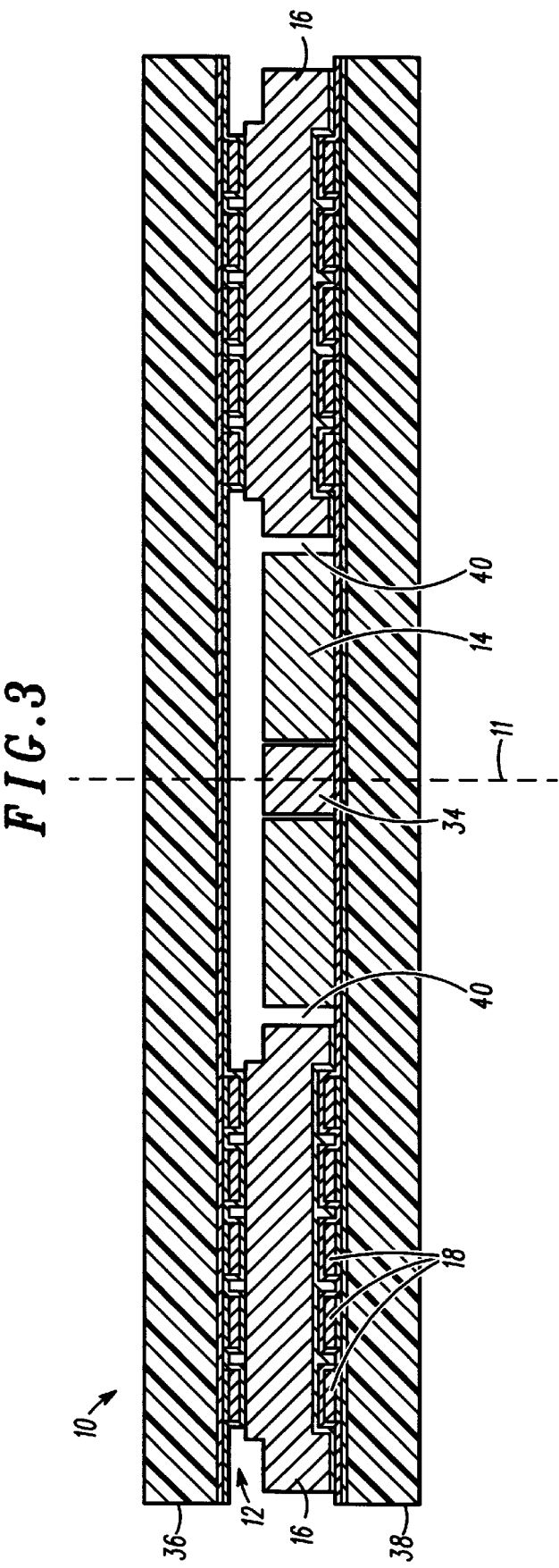

MICRO-TURBO GENERATOR DEVICE

FIELD OF THE INVENTION

This invention relates generally to a generator device for producing electrical power. More particularly, this invention relates to a micro-turbo generator device for producing electrical power wherein the turbine and the generator rotor are the same component.

BACKGROUND OF THE INVENTION

Turbo-generators have been proposed to produce power for electrical devices. A traditional turbo-generator system consists of a discrete turbine and a discrete generator which are coupled via a shaft. The turbine is used to convert momentum from a fluid stream into rotary motion. The shaft transmits the motion to the generator rotor, which typically contains permanent magnets or coil windings around each of its poles. Stator poles are typically arranged around the perimeter of the generator rotor, each of which is wrapped with coil windings The perimeter of the rotor is completely surrounded by stator poles to maximize energy conversion.

Variations of this design include the switched reluctance generator, in which the rotor has no permanent magnets or windings yet is still coupled to the turbine via a shaft, and several versions of a dual-purpose rotor design in which a single component functions as both the turbine and the generator rotor, having windings surrounding each of its poles or permanent magnets at the tips of each of its poles. In the latter case, because the stator poles surround the rotor, the fluid must be directed axially, rather than tangentially, through the turbine.

However, due to size constraints, these designs lead to limited use in portable electronic devices. Consequently, a need exists for a compact turbo-generator device capable of producing power for portable electronic devices.

BRIEF DESCRIPTION OF THE DRAWINGS

FIG. 3 is a sectioned plan view of a micro-turbo generator device in accordance with a preferred embodiment of the present invention.

DETAILED DESCRIPTION OF A PREFERRED EMBODIMENT

Figure 1:
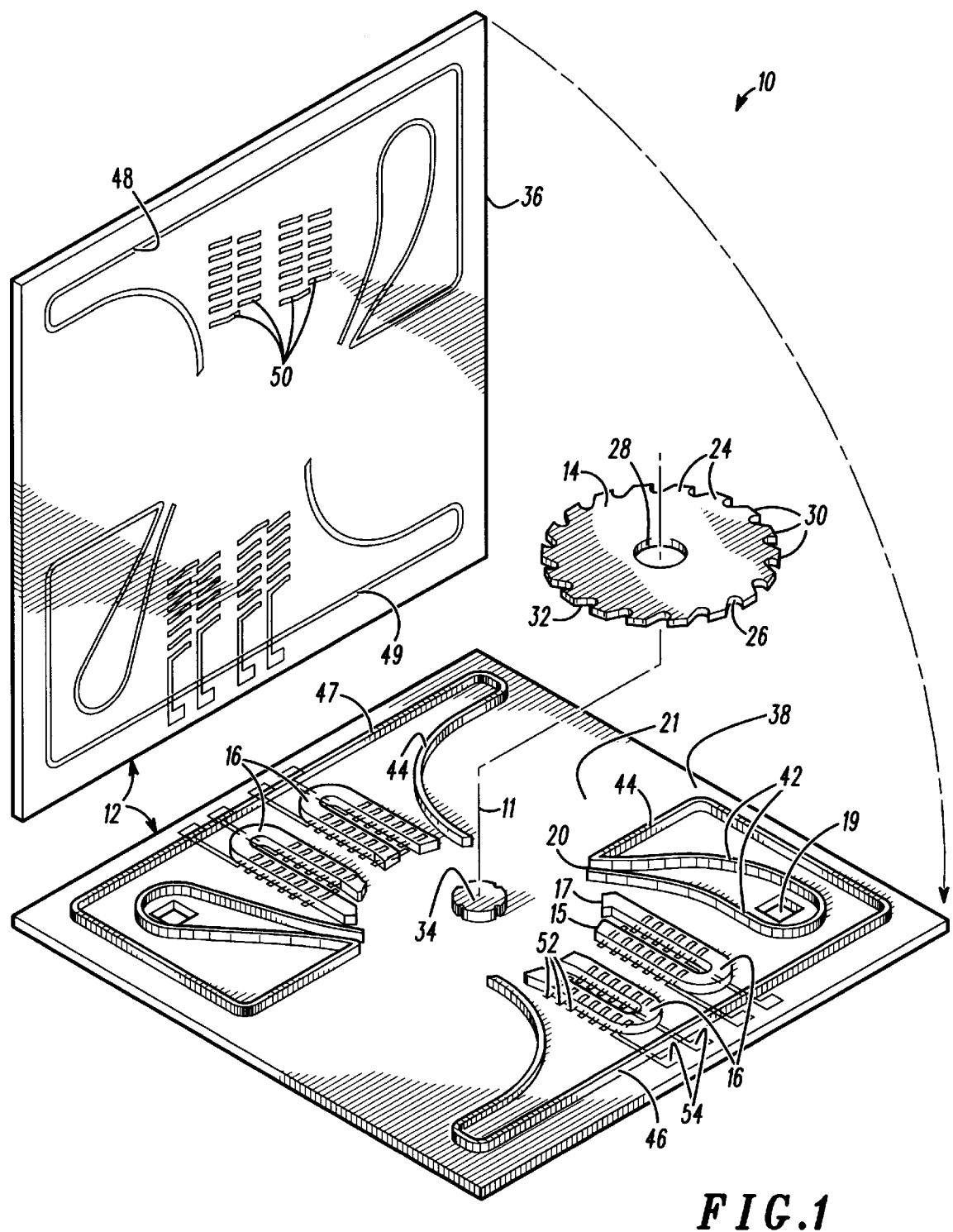
FIG. 1 is an exploded perspective view of a micro-turbo generator device in accordance with a preferred embodiment of the present invention.
Figure 2:
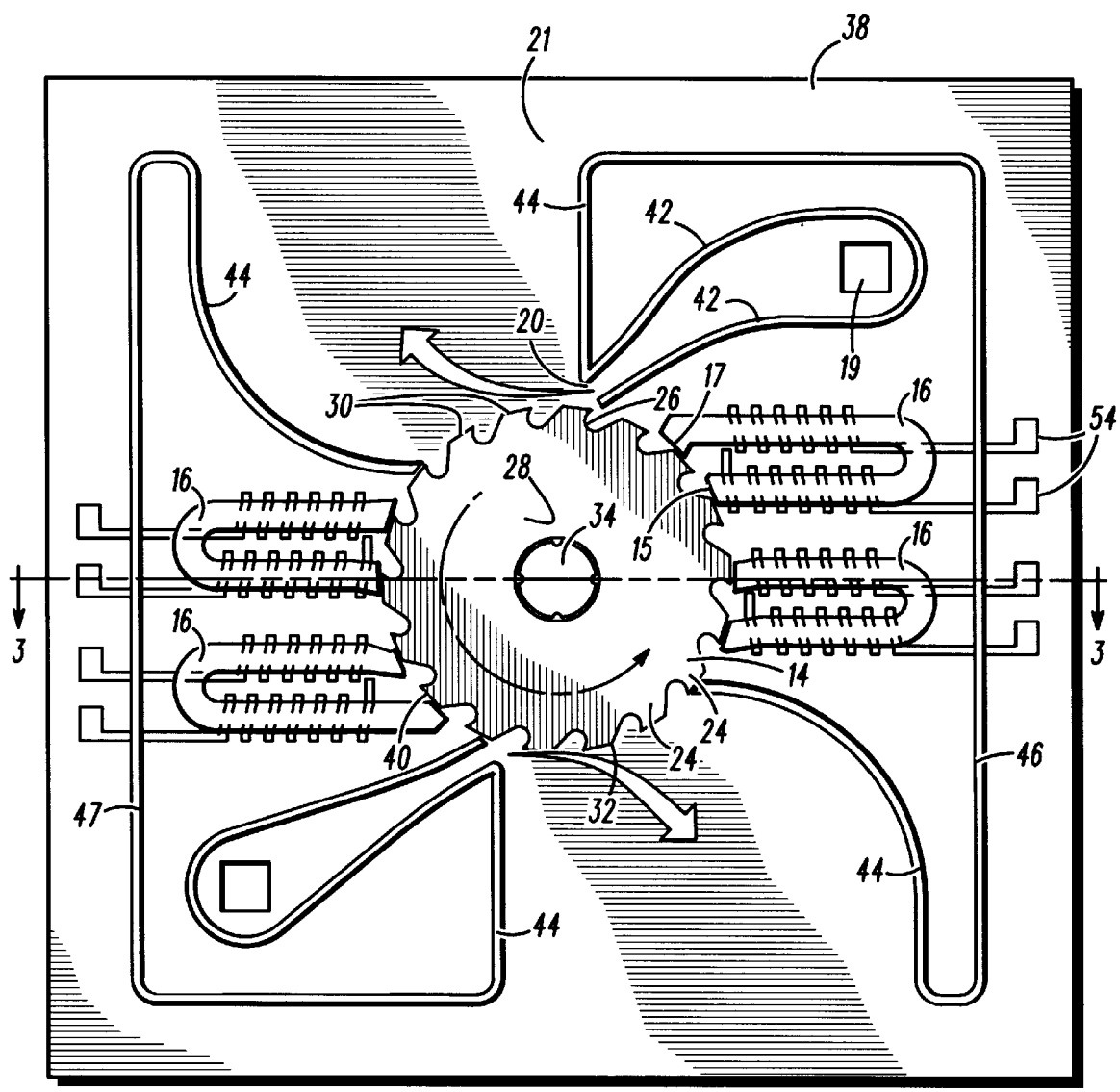
FIG. 2 is a cross-sectional top view of a micro-turbo generator device in accordance with a preferred embodiment of the present invention.

Referring to FIGS. 1–3, in accordance with a preferred embodiment of the present invention, a micro-turbo generator device 10 comprises, as major components, a housing 12, a rotor 14, a plurality of stator cores 16, and coils 18 formed helically around stator cores 16. In a preferred embodiment, housing 12 is formed of substrate 38 and cover 36 attached by seal frames 46 and 47, nozzle walls 42, exhaust walls 44, and ribbons 48 and 49. Housing 12 has a surface area of less than about one square centimeter and a combined thickness of less than about 50 mils. The small surface area and thickness make device 10 ideally suited for use in portable electronic products, particularly microelectronic devices. Housing 12 comprises nozzle walls 42 which, in cooperation with cover 36 and substrate 38, define a nozzle 20 for conveying and directing a fluid, preferably air, into device 10.

Axis 11 is defined as being perpendicular to shaft 34. Rotor 14 is rotatably mounted about shaft 34 in housing 12 and includes a hub 28 and a plurality of rotor poles 24 extending generally radially from axis 11. In a preferred embodiment, each rotor pole 24 has a magnetizable tip 30 and a concave fluid impact surface 26. Stator cores 16 are disposed about rotor 14 and each stator core 16 preferably has a first pole face 15 and a second pole face 17 adapted to lie proximate to perimeter 32 of rotor 14. The proximity of pole faces 15 and 17 to perimeter 32 allows the magnetic field formed therebetween to generate electrical energy according to a switched reluctance principle. Coils 18 are formed helically around stator cores 16 and are effective to conduct electrical current to magnetize stator cores 16.

Shaft 34, nozzle walls 42, exhaust walls 44, seal frames 46 and 47, stator cores 16, and rotor 14 are preferably constructed using a process in which thick photoresist material is exposed via x-ray radiation, and the subsequent voids in the photoresist material are filled with electroplated material, creating metal micro-structures. Thus, the portions of the design fabricated using this process are electroplated metal structures. The electroplated metal components are composed of a soft magnetic alloy. In a preferred embodiment, this alloy is composed of 78 weight percent nickel, with the balance being substantially iron. This alloy is commercially available under the trade name PERMALLOY. In a preferred embodiment, these electroplated components are fabricated concurrently to ensure that they have the same electroplated thickness, enabling proper sealing of seal frames 46 and 47, nozzle walls 42, and exhaust walls 44 with ribbons 48 and 49 during assembly. Shaft 34 is of a height that is not greater than the electroplated components to permit sealing closure of cover 36 onto substrate 38. In a preferred embodiment, substrate 38 and cover 36 are composed of silicon.

In a preferred embodiment, winding coils 18 are constructed of copper and solder utilizing a Controlled Collapse Chip Connection process, commonly referred to as a C4 process. Cover 36 has a pattern of conductive strips 50 which match a similar pattern of strips 52 on substrate 38, which lie beneath stator cores 16. Conductive strips 50 have bond pads with solder attached thereto. When assembled and reflowed, coil 18 will be fabricated by connecting cover strips 50 with substrate strips 52 by way of solder located on the ends of strips 50. By connecting top strips 50 with bottom strips 52, continuous coils are formed which conduct electricity therein to magnetize stator cores 16. Cover 36 also includes ribbons 48 and 49 over which solder has been deposited. Ribbons 48 and 49 are in a pattern which mirrors nozzle walls 42, exhaust walls 44, and seal frames 46 and 47, such that when cover 36 is attached to substrate 38, a seal is formed which allows fluid to flow through nozzle 20 toward rotor 14 with minimal air loss. In a preferred embodiment, inlets 19 are connected vertically through etched openings in substrate 38 to a pressurized fluid reservoir, not shown. In a preferred embodiment, the fluid reservoir contains air pressurized to about 5 psi. Outlets 21 are defined by exhaust walls 44, in cooperation with cover 36 and substrate 38, which allow the air to exhaust to the ambient atmosphere in a direction preferably parallel to the plane of substrate 38.

As an example of a preferred embodiment of the present invention, air is fed through inlets 19. The air travels through nozzle 20 toward rotor 14 and comes into contact with fluid impact surfaces 26. Fluid impact surfaces 26 are sized and shaped to provide maximum torque from the air that travels through nozzle 20. This impact forces rotor 14 to rotate about shaft 34. Rotor 14 is received in device 10 about shaft 34 and is adapted to rotate such that magnetizable tips 30 pass in proximity to first pole face 15 and second pole face 17 of stator cores 16. Tips 30 do not contact pole faces 15 and 17, but are separated by gap 40. In a preferred embodiment, gap 40 measures 3 microns, which allows rotor 14 to rotate freely about shaft 34 without encumbrance, while keeping tips 30 within proximity to pole faces 15 and 17 to facilitate transference of magnetic energy therebetween. Further, fluid is directed by nozzle 20 into device 10 and comes into tangential contact with fluid impact surfaces 26. As rotor 14 rotates, magnetizable tips 30 pass first pole face 15 and second pole face 17 while current in coils 18 creates a magnetic field in rotor poles 24, stator cores 16, and across gap 40. The magnetic flux produced by this field, when properly induced, provides a force on rotor 14 which tends to align magnetizable tips 30 with stator pole faces 15 and 17, hindering the rotation of rotor 14. The torque provided by the air flow allows rotor 14 to maintain a constant rotational velocity, while working against the torque provided by the magnetic field existing across gap 40. As this occurs, a voltage is generated across terminals 54 of coils 18, due to the changing magnetic flux within stator cores 16. This leads to electrical power generation.

In a preferred embodiment, a power converter is used to control the amplitude of the current and the duration during which it flows through each of the coils 18. Two electrical phases exist for the power generating system. The power converter consists of two semiconductor switches and two diodes for each of the two electrical phases The power converter draws current from a supply, typically a battery or capacitor, during the establishment of the magnetic field across gap 40 as inductance is increasing. Increasing inductance refers to those positions in which rotor poles 24 are approaching first pole face 15 and second pole face 17 prior to maximum inductance, during rotation about shaft 34. During the period of decreasing inductance, the switches are reversed, allowing power to be returned to the supply while also supplying current, and therefore power, to a load on the system. Decreasing inductance refers to those positions in which rotor poles 24 are moving away from stator pole faces 15 and 17 after maximum inductance, during rotation about shaft 34. In a preferred embodiment, a rotor position sensor is used to sense the position of rotor 14 to maximize the power generated by the rotation of rotor 14 through precise timing of the current switching operation.

The turbine characteristics of rotor 14 relate primarily to the spaces between magnetizable tips 30. These spaces define the turbine "blade" shape and have been designed such that there is a minimal shock loss when the fluid makes contact with fluid impact surface 26. The fluid strikes rotor 14 tangential to fluid impact surface 26. The torque produced by the turbine is sufficient to overcome the electrical torque created by the generator during the period in which tips 30 are coming out of alignment with pole faces 15 and 17 and while the inductance is decreasing. As earlier explained, this will result in power generation through helical coils 18 surrounding stator cores 16.

In the present invention, a single rotor forms both the turbine rotor and the generator rotor for the device. The combination rotor and turbine has wide, unsaturable magnetizable tips 30 for the generator function and curved rotor poles 24 for the turbine system. A key feature of the present invention is that rotor 14 includes no coil windings, thereby making it a completely passive component of the system. This renders the device very simple and compact, eliminating any need for brushes or permanent magnets, as are used in prior art devices.

For operation, a fluid must be able to pass into and out of device 10. Therefore, generator stator cores 16 cannot completely surround rotor 14 but must be open on at least two sides to allow the fluid to flow into and out of device 10. This can be accomplished by a short flux path switched reluctance generator design, whose stator cores can be physically isolated from each other, allowing flux to travel in a circular direction within a single stator core and two adjacent rotor poles. Therefore, in a preferred embodiment of the present invention, four separate, u-shaped stator cores 16 surround rotor 14. Cores 16 are located diametrically opposite each other and operate together to cancel any radial forces that might be exerted on shaft 34. These two sets of stator cores 16 are positioned to have an electrical phase difference of 180 degrees, so that when opposite cores are in an aligned position, the other cores are in an unaligned position. In a preferred embodiment, there are two areas of the device which are open to allow for gas flow into and out of device 10 on opposite sides of rotor 14, allowing nozzles 20 to be positioned 180 degrees out of phase. When fluid is striking a fluid impact surface on one side of the device, fluid from the opposite nozzle is not striking a fluid impact surface. This maintains a nearly constant level of flow-induced torque at any position on rotor 14 and eliminates the possibility of the rotation of rotor 14 stalling. In this manner, torque can be produced by the fluid at any rotor position.

The present invention is fabricated using standard microelectronic techniques and is able to output electrical power given a differential pressure input, as could be provided by an inlet from a small reservoir containing air at a modest gauge pressure and an exhaust to the ambient atmosphere. The present invention presents a design in which the turbine and the generator rotor are the same component, which eliminates the need for any mechanical linkages, and a controlled chip collapse connection assembly technique which simultaneously forms the coils encircling the stator cores and the fluid flow passages.

The present invention is able to generate electrical power on demand, at any time or location, without requiring the consumption of any commonly used resources. It produces no waste, and relies on air at a modest pressure to provide the torque necessary to turn the turbine and therefore generate power. By establishing this pressure through the use of a human-actuated pump, this device represents a low-cost alternative to battery cells as a source of electrical power for portable products. Further, the invention incorporates a dual-purpose rotor operating according to the switched reluctance principle, in which the rotor contains no windings or permanent magnets. By removing the windings and magnets from the rotor, a compact design of a turbo-generator device is achievable which allows it to be used in portable electronic devices.

While this invention has been described in terms of certain examples thereof, it is not intended that it be limited to the above description, but rather only to the extent set forth in the claims that follow.

The embodiments of this invention in which an exclusive property or privilege is claimed are defined as follows:

1. A micro-turbo generator device comprising:
   a housing comprising a shaft having an axis;
   a rotor rotatably mounted onto the shaft, said rotor comprising a perimeter and a plurality of rotor poles extending generally radially about the axis, each said rotor pole having a magnetizable tip and a concave fluid impact surface;
   a plurality of soft magnetic stator cores disposed about the rotor, each said stator core having first and second pole faces facing the perimeter of the rotor and spaced apart therefrom;

electrical coils helically encircling the stator cores for conducting electrical current to magnetize the stator cores to thereby magnetize the magnetizable tips and alternately conducting induced electrical current generated in response to changes in magnetic flux between the first and second pole faces and each said magnetizable tip; and means for directing fluid toward each said concave fluid impact surface to rotate the rotor about the shaft.

2. A micro-turbo generator device in accordance with claim 1, wherein the stator cores are u-shaped.

3. A micro-turbo generator device in accordance with claim 1, wherein the stator cores are distinct from each other.

4. A micro-turbo generator device in accordance with claim 1, wherein the rotor is composed of a soft magnetic alloy, and wherein the plurality of stator cores are composed of the soft magnetic alloy.

5. A micro-turbo generator device in accordance with claim 1, wherein the rotor and the plurality of stator cores are composed of a soft magnetic alloy composed of about 78 weight percent nickel and the balance substantially iron.

6. A micro-turbo generator device in accordance with claim 1, wherein the housing has a surface area of less than about one square centimeter.

7. A micro-turbo generator device in accordance with claim 1, wherein the housing has a height of less than about 50 mils.

8. The micro-turbo generator according to claim 1 wherein the electrical coils comprise sectional coils, each of the sectional coils including a first pattern of conductive strips affixed to the housing, a second pattern of conductive strips affixed to the housing, and solder joints connecting the first pattern to the second pattern.

9. The micro-turbo generator according to claim 8 wherein the solder joints are formed in a accordance with controlled collapse chip connection procedures.

10. A micro-turbo generator device comprising:

a rotor rotatably mounted in a housing and comprising a perimeter and a plurality of rotor poles, each of the plurality of rotor poles having a magnetizable tip and a concave fluid impact surface, said rotor being adapted to rotate such that each said magnetizable tip passes in proximity to a plurality of soft magnetic stator cores, each of the plurality of soft magnetic stator cores having a plurality of faces adapted to lie proximate to the perimeter and further such that fluid directed into the micro-turbo generator device comes in tangential contact with each said concave fluid impact surface; and means for conducting electrical current to magnetize the plurality of rotor poles and the plurality of soft magnetic stator cores to thereby magnetize each said magnetizable tip and the plurality of faces and alternately conducting induced electrical current generated in response to changes in the magnetic flux within the plurality of soft magnetic stator cores.

11. A micro-turbo generator device in accordance with claim 10, wherein the plurality of soft magnetic stator cores are u-shaped.

12. A micro-turbo generator device in accordance with claim 10, wherein the plurality of soft magnetic stator cores are distinct from each other.

13. A micro-turbo generator device in accordance with claim 10, wherein the housing has a surface area of less than about one square centimeter.

14. A micro-turbo generator device in accordance with claim 10, wherein the housing has a height of less than about 50 mils.

15. The micro-turbo generator according to claim 10 wherein the means for conducting electrical current comprises sectional coils, each of the sectional coils including a first pattern of conductive strips affixed to the housing, a second pattern of conductive strips affixed to the housing, and solder joints connecting the first pattern to the second pattern.

16. The micro-turbo generator according to claim 15 wherein the solder joints are formed in a accordance with controlled collapse chip connection procedures.

17. A micro-turbo generator device comprising:

a housing comprising a shaft having an axis;

a rotor rotatably mounted onto the shaft, said rotor comprising a perimeter and a plurality of rotor poles extending generally radially about the axis, each said rotor pole having a magnetizable tip and a concave fluid impact surface;

a plurality of soft magnetic stator cores disposed about the rotor, each said stator core having first and second pole faces facing the perimeter of the rotor and spaced apart therefrom;

electrical coils helically encircling the stator cores for conducting electrical current to magnetize the stator cores to thereby magnetize the magnetizable tips and alternately conducting induced electrical current generated in response to changes in magnetic flux between the first and second pole faces and each said magnetizable tip; and a nozzle for directing fluid toward each said concave fluid impact surface to rotate the rotor about the shaft.

18. The micro-turbo generator according to claim 17 wherein the electrical coils comprise sectional coils, each of the sectional coils including a first pattern of conductive strips affixed to the housing, a second pattern of conductive strips affixed to the housing, and solder joints connecting the first pattern to the second pattern.

19. The micro-turbo generator according to claim 18 wherein the solder joints are formed in a accordance with controlled collapse chip connection procedures.

* * * * *